(12) United States Patent
Galloway

(10) Patent No.: US 6,493,785 B1
(45) Date of Patent: Dec. 10, 2002

(54) COMMUNICATION MODE BETWEEN SCSI DEVICES

(75) Inventor: William C. Galloway, Houston, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/506,709

(22) Filed: Feb. 18, 2000

Related U.S. Application Data

(60) Provisional application No. 60/120,839, filed on Feb. 19, 1999.

(51) Int. Cl.[7] ................................................ G06F 13/36
(52) U.S. Cl. ........................ 710/314; 710/313; 710/105
(58) Field of Search ................................ 710/314, 313, 710/105

(56) References Cited

U.S. PATENT DOCUMENTS

| | | | |
|---|---|---|---|
| 5,463,743 A | 10/1995 | Galloway | 395/285 |
| 5,522,054 A | 5/1996 | Gunlock et al. | 395/439 |
| 5,613,074 A | 3/1997 | Galloway | 395/280 |
| 5,675,723 A | 10/1997 | Ekrot et al. | 395/182.02 |
| 5,692,200 A | 11/1997 | Carlson et al. | 395/735 |
| 5,751,977 A | 5/1998 | Alexander | 395/306 |

*Primary Examiner*—Peter Wong
*Assistant Examiner*—David S. Glass
(74) *Attorney, Agent, or Firm*—Akin Gump Strauss Hauer & Feld LLP

(57) ABSTRACT

The present invention relates to a method of in-band communication, outside the standard SCSI communication protocol, between SCSI bus repeaters and initiator devices. The present invention implements the communication mode during the message phase of the SCSI protocol and allows initiators on a SCSI bus to determine the number, location and status of SCSI repeaters accessible on the SCSI bus.

33 Claims, 6 Drawing Sheets

COMMUNICATION MODE BETWEEN SCSI DEVICES

SPECIFICATION

This application claims the benefit of U.S. Provisional Application No. 60/120,839, filed Feb. 19, 1999, which is incorporated herein by reference.

BACKGROUND OF THE INVENTION

1. Field of the Invention

The present invention relates to communication with bus repeater devices within a computing system and, more particularly, to a method that enables initiators on a computer bus to determine the number, location and status of repeater devices on the computer bus.

2. Description of the Related Art

As long as there have been computers, users have attached peripheral hardware devices to them. Some of the typical hardware interfaces include Integrated Drive Electronics (IDE) and Enhanced IDE (EIDE) buses. One of the more popular and enduring interfaces is the small computer system interface (SCSI) bus. While an IDE bus is restricted to two disk drives and an EIDE bus is restricted to four devices, including hard disks and CD-ROM drives, the SCSI bus is able to support up to fifteen devices such as disk drives, CD-ROM drives, optical drives, printers, and communication devices. One of the attractions of the SCSI bus is its ability to easily adapt to new types of devices by using a standard set of commands, or the SCSI-3 command set.

The SCSI protocol specifies that communication between an initiator, or device that issues SCSI commands, and a target, a device that executes SCSI commands, takes place in phases: a BUS_FREE, ARBITRATION, SELECTION, RE-SELECTION, COMMAND, DATA, MESSAGE_IN, MESSAGE_OUT and STATUS phase. The first four phases, BUS_FREE, ARBITRATION, SELECTION, and RE-SELECTION, are used to setup a connection between an initiator and a target device.

The BUS_FREE phase is the initial state and, during the BUS_FREE phase, any SCSI device on a particular SCSI bus can attempt to take control of the bus. Often two or more devices request control at the same time (or within the period of a "bus settle delay"—typically 400 nanoseconds). Which device gains control is determined in the ARBITRATION phase. After the ARBITRATION phase, the SELECTION phase is performed where the initiator selected in the ARBITRATION phase signals a specific target device that a service is requested. The RE-SELECTION phase is used when an interrupted connection needs to be reestablished.

In the final phases, COMMAND, DATA, MESSAGE_IN, MESSAGE_OUT and STATUS, are known collectively as the DATA phases. During the DATA phases, the target device receives commands from the initiator, the two exchange data, and, if necessary, messages and status information are communicated.

To maximize performance, a SCSI bus should not exceed a predetermined length. For example, the predetermined length can be exceeded when a server, located in one box or unit, is connected through a SCSI bus to a mass storage subsystem, such as a disk drive array or a CD-ROM drive located in another box or unit. To prevent performance degradation, designers have implemented what is known as repeater circuits. Repeater circuits are used to couple short, terminated SCSI bus segments. The repeater circuit includes two ports with each port connected to a different terminated SCSI bus segment. The repeater circuit provides a buffer between the terminated bus segments in order to achieve a high performance SCSI bus that exceeds the predetermined length. To a SCSI controller, the terminated bus segments appear as a single SCSI bus.

SUMMARY OF THE INVENTION

The present invention relates to a method of and apparatus for in-band communication, outside the standard SCSI communication protocol, between an initiator device and either a SCSI bus repeater or a "daisy-chain" of repeaters. The method and apparatus enable an initiator on a SCSI bus to determine the number, location and status of SCSI repeaters accessible on the SCSI bus. In addition, the method of and apparatus for the present invention enables communication that does not conform to a bus's standard protocol to occur between devices on the bus One embodiment of the present invention implements the in-band communication mode during the MESSAGE_IN phase of the SCSI protocol. The communication mode is initiated between an initiator and either a repeater or a chain of repeaters on a SCSI bus whenever four particular conditions are met for a length of time exceeding a bus settle delay.

Upon the occurrence of the four conditions for a length of time exceeding the bus settle delay, the repeater halts normal "pass-through" functions, synchronizes to a clock signal (specifically the ATN signal) originating from the initiator, and communicates to the requesting initiator information such as an ID number, a device type, a revision number of the target's software, and a checksum (to ensure that data has been communicated correctly).

Upon completion of the non-SCSI communication, the repeater resumes pass-through functionality, enabling either a target device to utilize normal SCSI communications or the next repeater in the chain of repeaters to repeat the non-SCSI communication process. In this fashion, repeaters can be strung together and the initiator is able to determine the number, location and status of each. Once all repeaters in the chain have completed the non-SCSI communication, the last repeater in the chain resumes pass-through functions and a target can be reached. The initiator and target can then initiate or resume standard SCSI communication.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF INVENTION

This application is related to the following co-pending, concurrently filed, and commonly assigned United States patent applications which are hereby incorporated by reference:

U.S. patent application Ser. No. 09/507,278, entitled "SCSI Repeater Circuit With SCSI Address Translation And Enable;"

U.S. patent application Ser. No. 09/507,000, entitled "SCSI Data Rate Speed Determination;"

U.S. patent application Ser. No. 09/507,072, entitled "SCSI Clock Stretching;" and U.S. patent application Ser. No. 09/507,071, entitled "Set Up Time Adjust."

Figure 1:
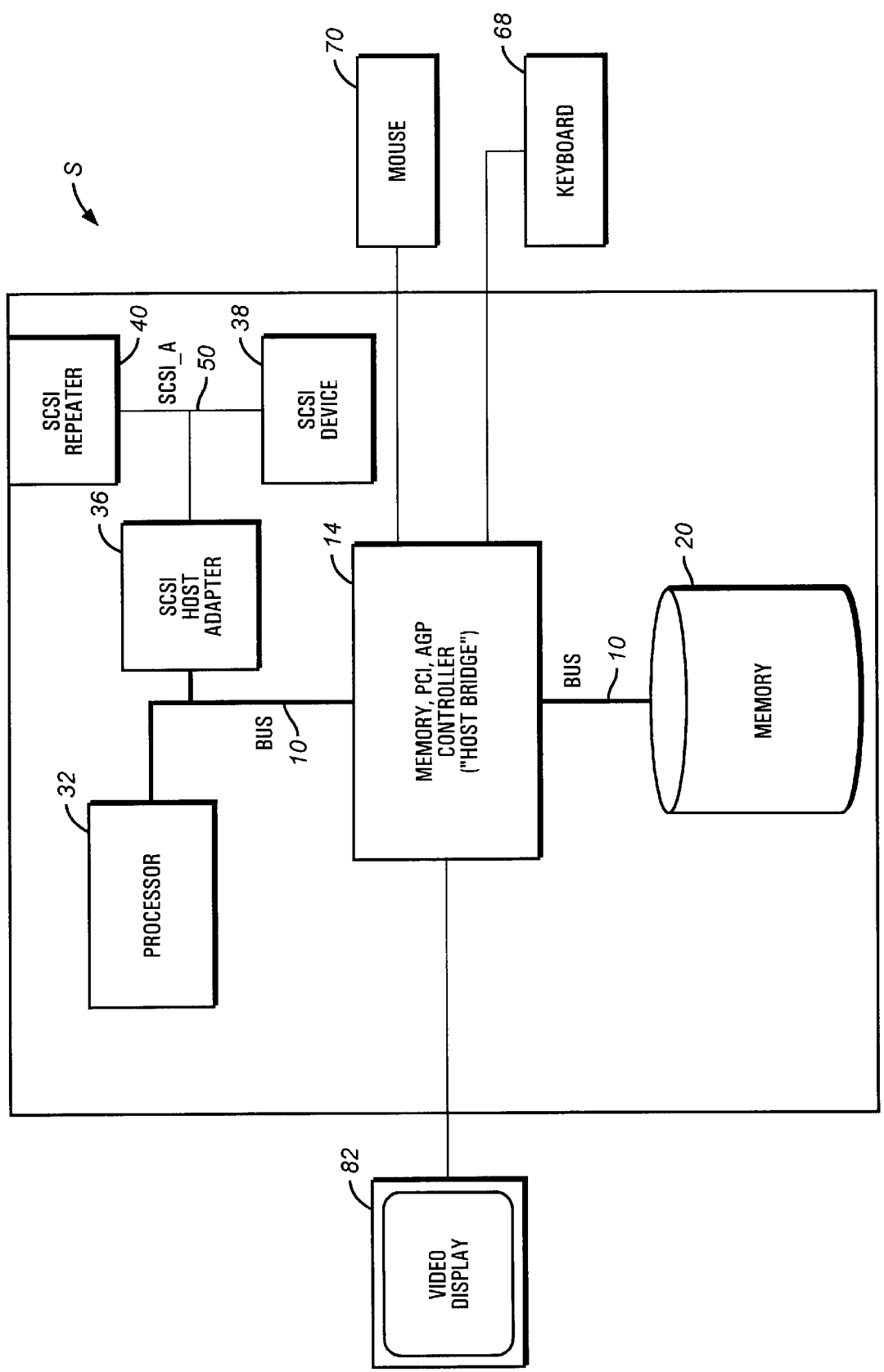
FIG. 1 is a block diagram of a computing system S showing a data bus, peripheral devices, and a SCSI host adapter.

Turning to FIG. 1, illustrated is a typical computing system S in which a bus repeater utilizing the method of the present invention can be installed. The computing system S in the illustrated embodiment is a PCI bus based machine, having a peripheral component interconnect (PCI) bus 10. The PCI bus 10 is controlled by PCI controller circuitry located within a memory/accelerated graphics port (AGP)/PCI controller 14. This controller 14 (the "host bridge") couples the PCI bus 10 to a processor 32 and a memory subsystem 20.

The host bridge 14 in the disclosed embodiment is a 440LX Integrated Circuit by Intel Corporation, also known as the PCI AGP Controller (PAC). The processor 32 is preferably a Pentium II. The processor 32 could be replaced with a different processor, other than the Pentium II, without detracting from the spirit of the invention. In addition, it is not critical to the invention that the bus 10 is a PCI bus. Other buses such as an Integrated Drive Electronics (IDE) or Enhanced IDE (EIDE) bus may be employed. A video display 82, a mouse 70, and a keyboard 68 are coupled to the host bridge 14, enabling human interaction with the computing system S.

Finally, a SCSI host adapter 36 is shown connected to the PCI bus 10. Connected to the SCSI host adapter 36 by means of a SCSI_A bus 50 are a SCSI device 38 and a SCSI repeater 40 (see previously incorporated U.S. patent application entitled "SCSI Repeater Circuit With SCSI Address Translation And Enable"). The SCSI device 38 could be an internal device such as a CD-ROM drive or a tape drive. For the purposes of this example, the SCSI host adapter 36 and the SCSI repeater 40 employ the methods according to the present invention, for example to determine optimum values for the timing of a setup or hold interval (see previously incorporated U.S. patent application entitled "Set Up Time Adjust"). A setup interval may require adjustment to compensate for changes in the load on a SCSI repeater due to the current SCSI configuration and the number of SCSI repeaters attached to the computing system.

In a SCSI configuration, a SCSI host adapter 36 follows the same communication protocol as any other SCSI device and appears to a target as would any other SCSI device. The selection of the SCSI host adapter 36 as an example of a device that would use the method of the present invention is arbitrary; any SCSI device, particularly initiators, can use the method. In addition, the computing system S illustrates only one platform utilizing the method according to the present invention. The method according to the present invention is also not necessarily restricted to a SCSI bus or SCSI devices; any device that can be attached to a computer bus of any type could also employ the method.

Figure 2:
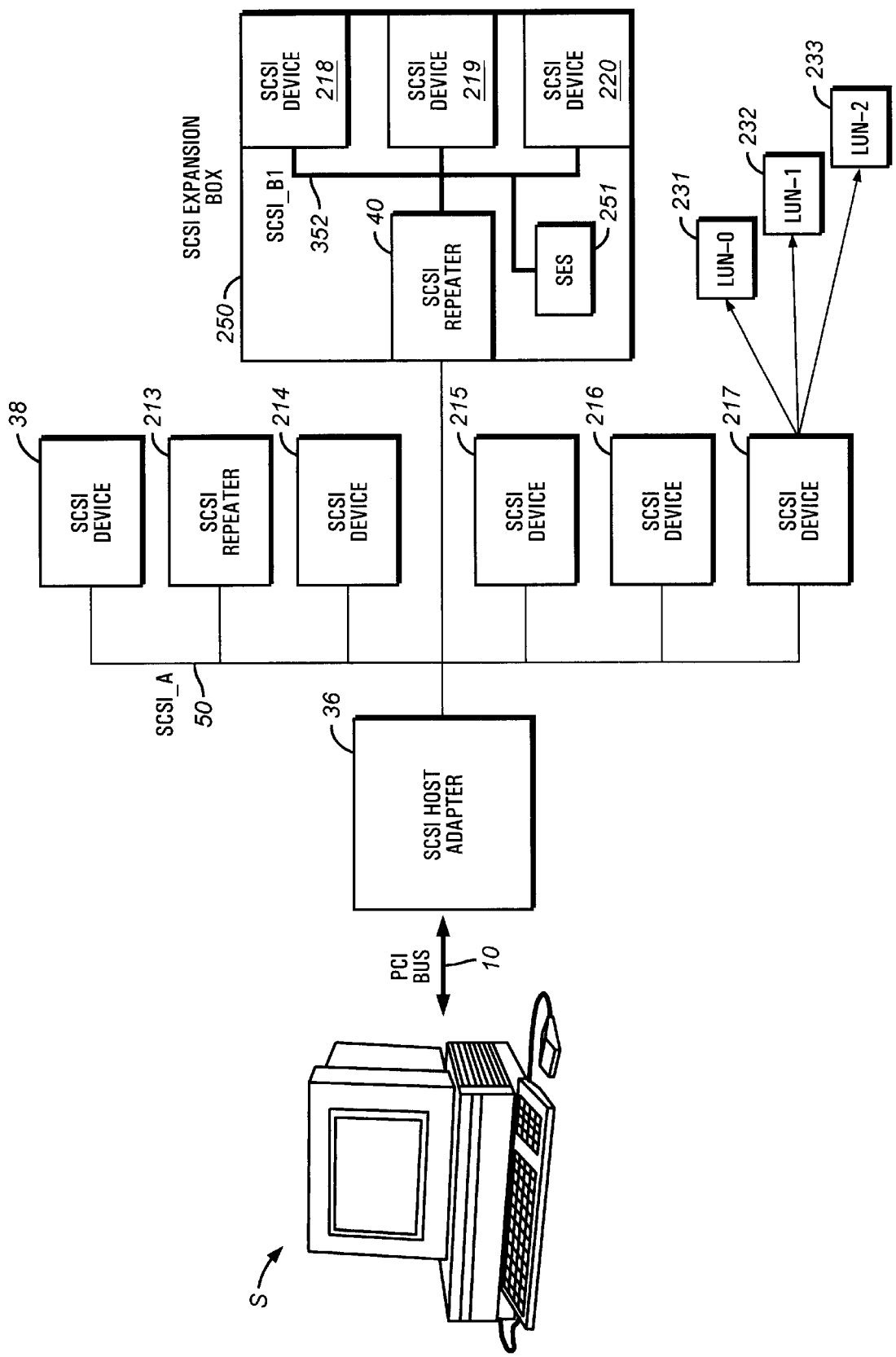
FIG. 2 is a block diagram of a portion of the computing system S showing the SCSI host adapter, a SCSI bus, and a number of additional SCSI devices.

Turning now to FIG. 2, illustrated is a portion of the computing system S showing the SCSI host adapter 36, the SCSI_A bus 50, the SCSI device 38, the SCSI repeater 40 incorporated into a SCSI expansion box 250, additional SCSI devices 214–220 and a SCSI repeater 213 which is similar to SCSI repeater 40. Also shown are three logical units (LUNs) 231–233. LUNs 231–233 represent multiple units that together make up the single SCSI device 217. An example of this configuration might be a bank of disk drives where each drive is assigned a LUN ID and all are accessed thorough a single SCSI ID. A SCSI ID uniquely identifies each device on a particular SCSI bus but further identification may be necessary to perform a specific transaction. The SCSI repeaters 40 and 213 appear to the SCSI host adapter 36 as any other SCSI device, utilizing standard SCSI protocols as well as the method of the present invention.

The SCSI expansion box 250 is an example of a SCSI repeater 40 employed external to the computing system S and providing additional storage capability for it. Incorporated into the SCSI expansion box 250 is a SCSI enclosure service (SES) device 251. The SES 251 monitors and reports the status of the SCSI expansion box 250. The SES 251 may also provide control capability for the SCSI repeater 40. Preferably, the SES 251 is actually implemented on the same integrated circuit as the SCSI repeater 40.

Figure 3:
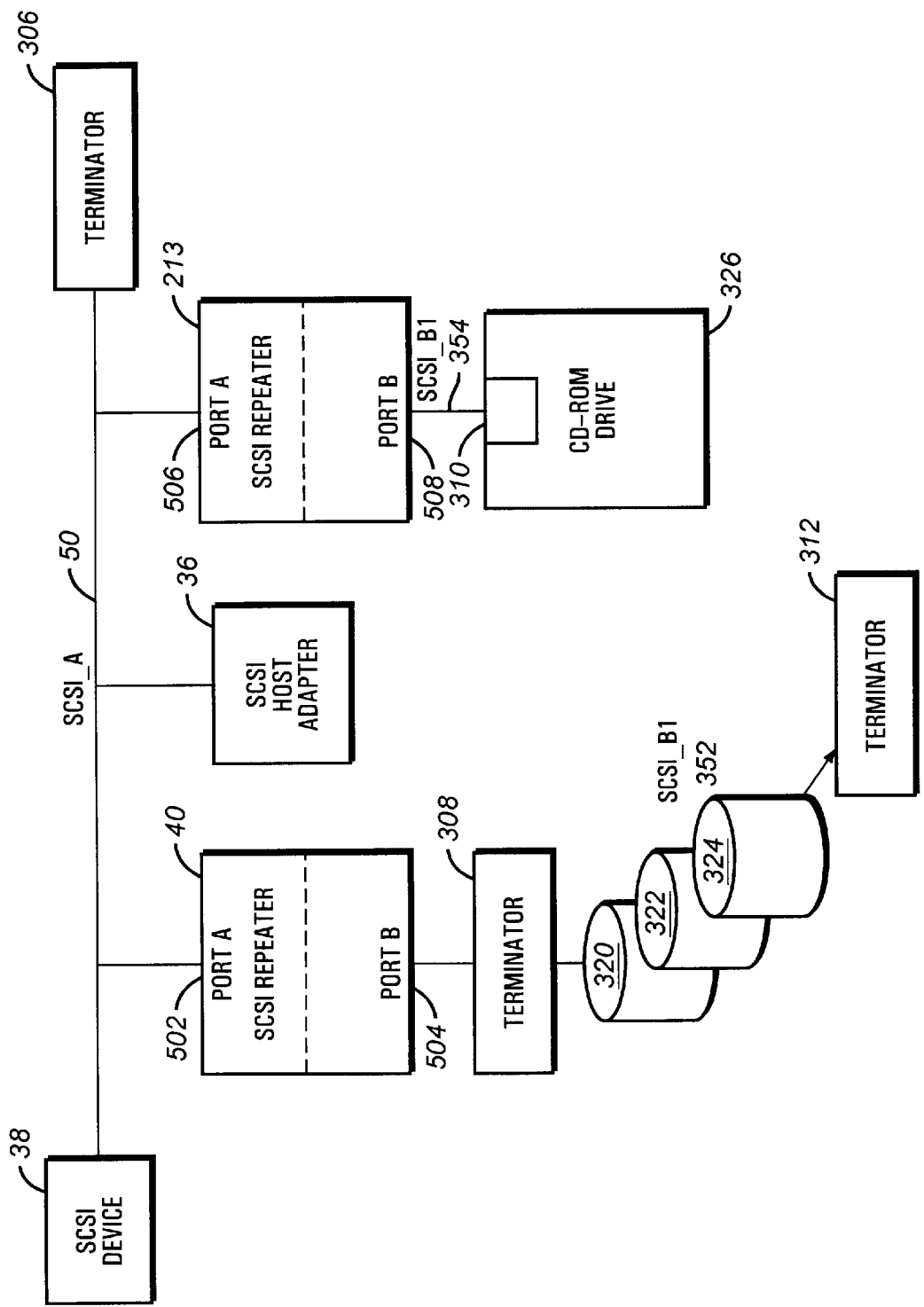
FIG. 3 is a block diagram of a SCSI bus showing two SCSI repeaters on which the method of the present invention might be implemented.

Turning now to FIG. 3, illustrated is SCSI_A 50 of the computing system S. For simplicity, the SCSI host adapter 36, the SCSI device 38, and the two SCSI repeaters 40 and 213 are the only SCSI devices from FIG. 2 that are shown. The SCSI repeaters 40 and 213 are divided into port A 502 and 506 and port B 504 and 508 respectively (see FIG. 5). Port A 502 of repeater 40 and port A 506 of repeater 213 are both connected to SCSI_A 50. Port B 504 of repeater 40 and port B 508 of repeater 213 are connected to a SCSI_B1 352 bus and a SCSI_B2 354 bus respectively.

Typically SCSI buses employ termination to prevent reflection and improve signal quality, and a terminator 306 on SCSI_A 50 is illustrated. SCSI repeaters 40 and 213 are representative of devices on which the method of the present invention is implemented. SCSI repeaters 40 and 213 might serve as targets for the SCSI host adapter 36, functioning as an initiator. SCSI repeater 40 is connected to a bank of disk drives 320, 322, and 324 by means of SCSI_B1 352. In addition, SCSI_B1 352 is terminated by a pair of terminators 308 and 312. The SCSI repeater 213 is connected to a single SCSI device, a CD-ROM drive 326, by means of the SCSI_B2 354. SCSI_B2 354 is terminated by a terminator 310 that is internal to the CD-ROM drive 326. It is not necessary that SCSI devices 40 and 213 be connected to disk drives or a CD-ROM drive; they may be connected to other types of devices such as printers or communication devices.

Figure 4:
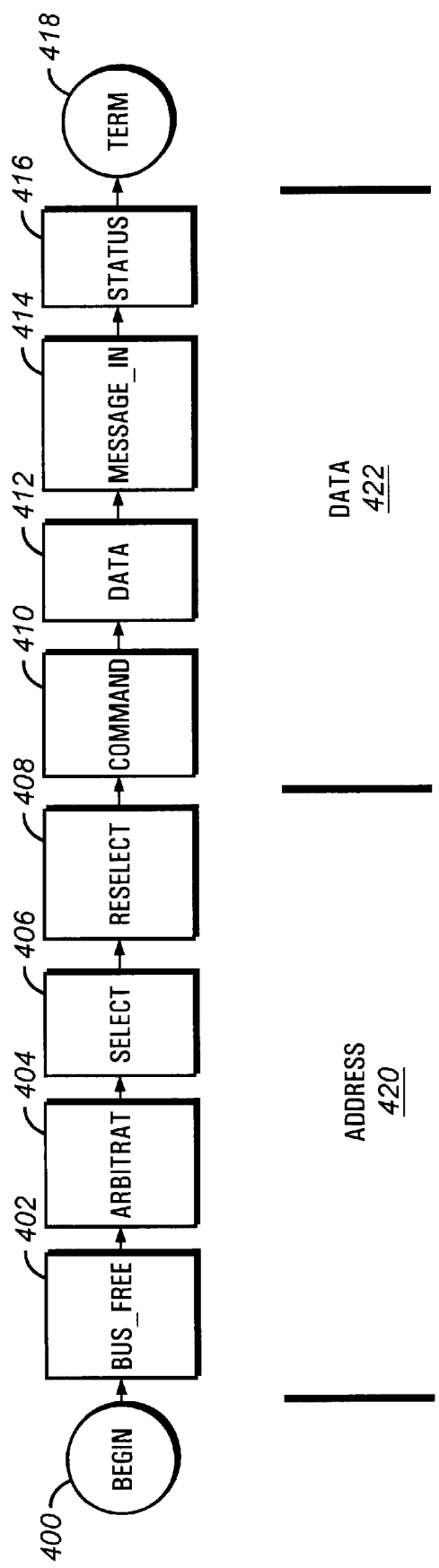
FIG. 4 is a block diagram showing the eight phases of a SCSI communication protocol.

Turning now to FIG. 4, illustrated is a flow diagram of the phases of the SCSI protocol according to the present invention. Although much of the processing of the SCSI protocol such as ARBITRATION, SELECT and RESELECT takes place on the SCSI repeater 40, each device connected to the bus employs the protocol to communicate with the repeater and other connected devices. A process 401 begins in a BUS_FREE step 402. In the BUS_FREE step 402, an initiator 38 determines whether the SCSI_A bus 50 is under the control of another SCSI device. SCSI_A 50 is used for the purpose of illustration only; the described protocol is applicable to any SCSI bus. If the initiator determines that SCSI_A 50 is available, it asserts a request for SCSI_A 50 in the ARBITRATION step 404 by placing SCSI_A 50 in a busy state and sending its SCSI ID onto SCSI_A 50. If the initiator 36 is the only SCSI device requesting SCSI_A 50, the SCSI host adapter gives the SCSI device 36 control of SCSI_A 50. In the event of requests for SCSI_A 50 from multiple devices within a "bus settle delay" time frame, the SCSI host adapter 36 gives control of SCSI_A 50 to the initiator with the highest priority, typically the device with the highest SCSI ID number.

The SCSI device which gains control of SCSI_A 50, in the present example SCSI device 36, proceeds to the SELECT phase 406 where the SCSI device 36 asserts a signal that represents the SCSI ID of the requested target 40. If the communication between SCSI device 36 and SCSI repeater 40 is a resumption of a previously interrupted communication, control proceeds to a RESELECT step 408, otherwise control passes to a COMMAND phase 410.

In the RESELECT step 408, a SCSI device that was interrupted in a previous request, such as when a tape drive relinquishes control of SCSI_A 50 while accessing data stored on a sequential tape, reestablishes the communication link and control passes to the COMMAND step 410.

The first four phases, BUS_FREE 402, ARBITRATION 404, SELECT 406, and RESELECT 408 are known collectively as ADDRESS phases 420. The last four phases, a COMMAND 410, DATA 412, MESSAGE_IN 414, and STATUS 416, are known as DATA phases 422.

During the COMMAND phase 410, the initiator 36 and the target exchange commands. During the DATA phase 412, the initiator 36 and the target exchange data. During the MESSAGE phase 414, the initiator 36 and the target exchange messages and may communicate using the method of the present invention (see FIG. 6). During the STATUS phase 416, the initiator 36 and the target exchange status information. Once the initiator 36 has completed the DATA phases 422, the initiator 36 returns SCSI_A 50 into the BUS_FREE state 402 by issuing a TERM control signal 418, making SCSI_A 50 available for other devices.

FIG. 4 illustrates one possible flow of the SCSI protocol. In practice, the MESSAGE_IN phase 414 may be separated into MESSAGE_IN and a MESSAGE_OUT phases and most phases can transition to and from multiple other phases.

Figure 5:
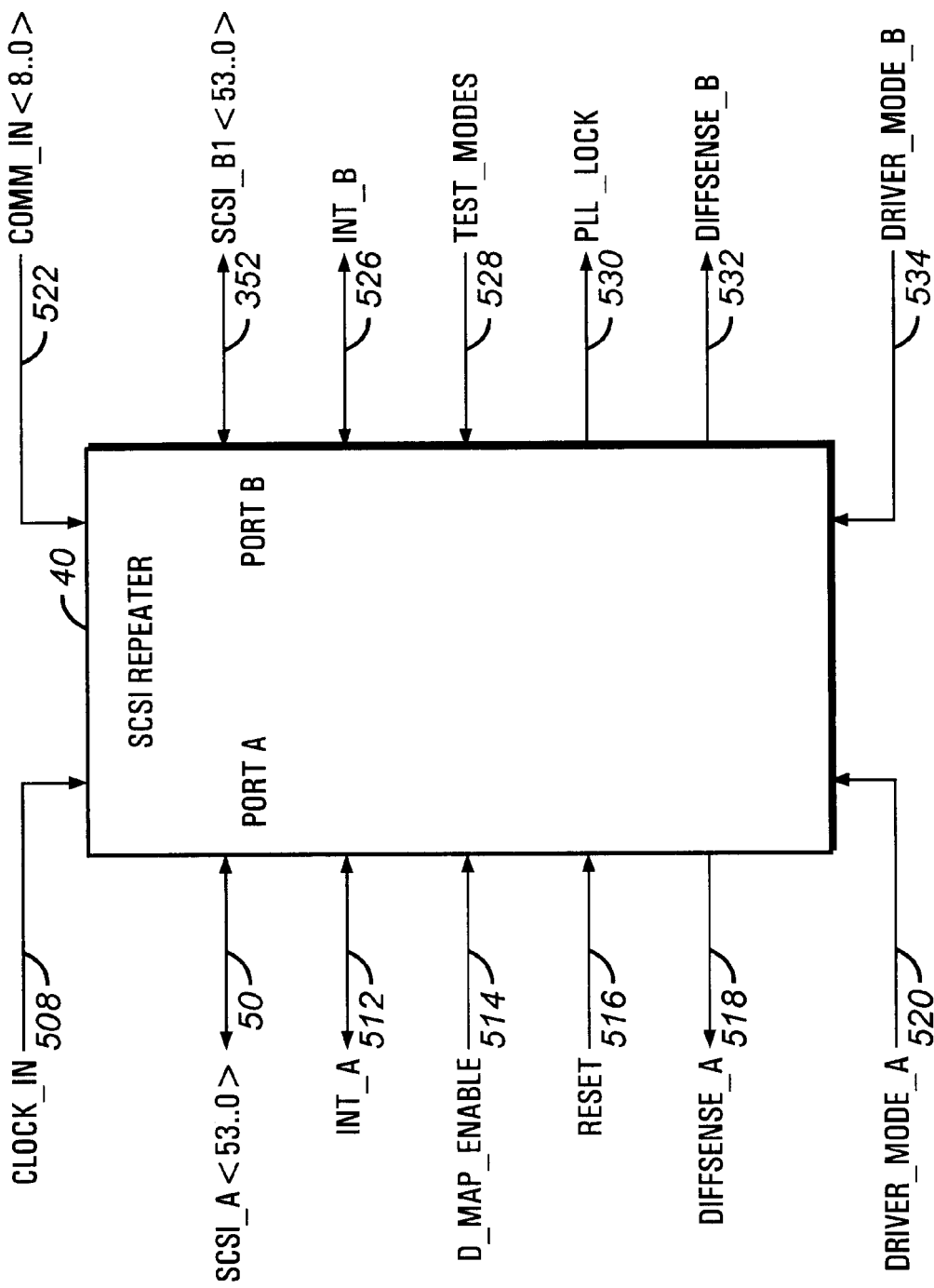
FIG. 5 is a signal diagram illustrating the input and output signals of a SCSI repeater that utilizes the method of the present invention.

Turning now to FIG. 5, illustrated are the input and output signals of a SCSI repeater 40 which can employ the method according to the present invention. Now referring to port A 502 of repeater 40, SCSI_A<53..0> 50 represents fifty-four signals that the repeater 40 can provide to and receive from a wide multi-mode SCSI bus coupled to port A 502. As explained above, SCSI_A<53..0> 50 can address up to 16 SCSI bus devices during a SELECT phase 406 through the data signals of SCSI_A<53 ..0> 50, represented by DBA<15..0> (not shown). An initiator 38 or controller 36 is coupled to SCSI_A<53..0> 50 and occupies one SCSI device address, or SCSI ID. A SCSI ID refers to one bit of the data bus of the SCSI bus, DBA<15..0>, that is assigned to a SCSI device. Targets, such as disk drives, typically occupy the remaining 15 SCSI IDs.

In normal operation, the SCSI repeater 40 drives all signals asserted on port A 502 to port B 504 and all signals asserted on port B 504 to port A 502. An INT A signal 512 on port A 502 and a INT B signal 526 on port B 504, which may be used for an sideband signaling technique, are not relevant to the present invention.

A DRIVER_MODE_A signal 520 on port A 502 controls the SCSI buffer driver modes for SCSI_A 50. Possible mode values include single-ended, low voltage differential, and disabled. The current mode of DRIVER_MODE_A 520 is determined by checking a DIFFSENSE_A signal 518.

Now referring to port B 504 of repeater 40, SCSI_B1<53..0> 352 represents the signals that repeater 40 can provide to and receive from a wide multi-mode SCSI bus coupled to port B 504. Similar to SCSI_A<53..0> 50, SCSI_B1<53..0> 352 includes data signals, represented by DBB<15..0>, that can address up to sixteen SCSI devices. In one embodiment utilizing repeater 40, port B 504 is actually coupled to narrow SCSI buses that can address a limit of eight SCSI devices A DRIVER_MODE_B signal 534 provides similar functions on SCSI_B1 352 as the DRIVER_MODE_A signal 520 provides on SCSI_A 50. The current mode of DRIVER_MODE_B 534 is determined by checking a DIFFSENSE_B signal 532.

Now referring to signals not specific to either port A 502 or port B 504, a CLOCK_IN 508 signal provided to control all timing internal to the SCSI repeater 40. Typically, the signal is 40 Mhz with a 60/40 duty cycle. In the present example, the SCSI repeater 40 may multiply the CLOCK_IN 508 signal to derive a 240 Mhz clock used internal to the SCSI repeater 40.

A PLL_LOCK signal 530 reports, when interrogated, whether a phase lock loop (PLL) in the SCSI repeater 40 is locked or unlocked. A RESET 516 signal puts the SCSI repeater 40 into a known state. A TEST_MODE signal 528, when asserted, forces the SCSI repeater 40 into a test mode such as a pass-through mode that passes all signals from the port A 502 to port B 504 and all signals from port B 504 to port A 502.

A COMM_IN<7..0> signal 522 represents additional input signals to the SCSI repeater 40. In one embodiment, the SCSI repeater 40 is employed in the SCSI expansion box 250 which contains multiple SCSI disk drives. The COMM_IN<7..0> signals 522 carry status data from the SES 251 to the SCSI repeater 40. The COMM_IN signals 522 are written during the eighth edge 628 (see FIG. 6) of the method of the present invention, enabling an initiator to receive the status data from the SES 251.

Address translation, or mapping functions, for SCSI repeater 40 are enabled by an I_MAP_ENABLE ("MAP") signal 514, of SCSI repeater 40. When MAP 514 is TRUE, SCSI repeater 40 performs address translation during the ADDRESS phases 420 of SCSI_A 50.

During the DATA phases 422 of the SCSI_A 50, the data signals on the SCSI buses coupled to port A 502 and port B 504, represented by DBA<15..0> and DBB<15..0>, are transferred either synchronously or asynchronously by the SCSI repeater 40. Furthermore, during the DATA phases 422, DBA<15..0> and DBB<15..0> are mapped directly to each other which means DBA<15> is mapped to DBB<15>, DBA<14> is mapped to DBB<14> and so forth.

The method of and apparatus for the present invention employ the SCSI repeater 40 and SCSI_A 50 to implement in-band communication that is outside the standard SCSI protocol. In one embodiment, the method enables an initiator on the SCSI_A 50 to determine the number, location and status of SCSI repeaters 40 on the computing system S. In another embodiment, the method might enable the SCSI_A 50 to optimize its setup to for better performance.

When the SCSI repeater 40 is connected to the SCSI_A bus 50 and the SCSI_A bus 50 and the SCSI_B1 bus 352 are in the MESSAGE_IN phase 414 of the SCSI protocol, the in-band communication mode of the present invention can be initiated by the SCSI device 38 by de-asserting the SCSI_A 50 REQ signal (not shown) and asserting the SCSI_A 50 ACK signal (not shown) for a period that exceeds a "bus settle delay" period (typically 400 nanoseconds). Together, the existence of these conditions are referred to as a communication mode enable signal.

Figure 6A:
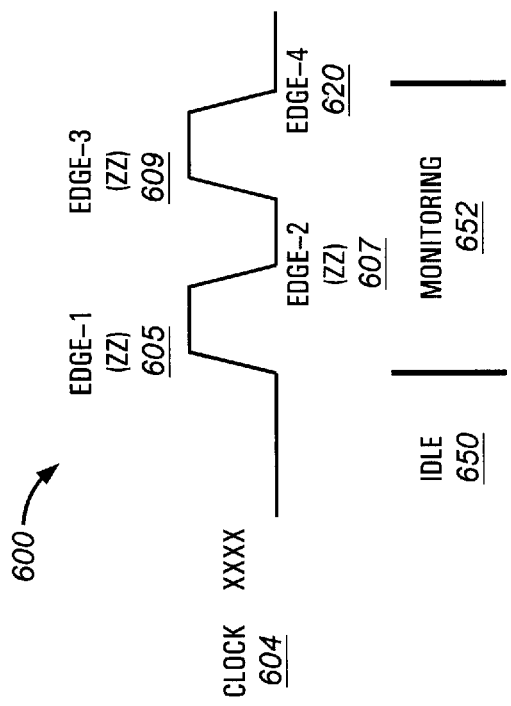
FIGS. 6A and 6B are diagrams of the clock signal that synchronizes the method of the present invention.

Turning now to FIG. 6A, illustrated is a timing diagram 600 of a clock signal 604 received at the SCSI repeater 40 when the four preceding conditions have been met. In one embodiment of the present invention, the clock signal 604 is derived from an ATN pin of the SCSI host adapter 36, which employs the method of the present invention to query the SCSI repeater 40. When the four conditions are satisfied, the SCSI repeater enters an IDLE state 650. While in the IDLE state, the SCSI repeater 40 does not modify any signal on SCSI_A 50 or SCSI_B1 352.

The SCSI repeater 40 then enters a MONITORING state 652 and counts a rising clock rising edge-1 605, a falling clock edge-2 607, a rising clock edge-3 609, and a falling clock edge-4 620. During the MONITORING state 652, the SCSI repeater 40 does not modify any signal on the SCSI_A 50 or the SCSI_B1 352.

Figure 6B:
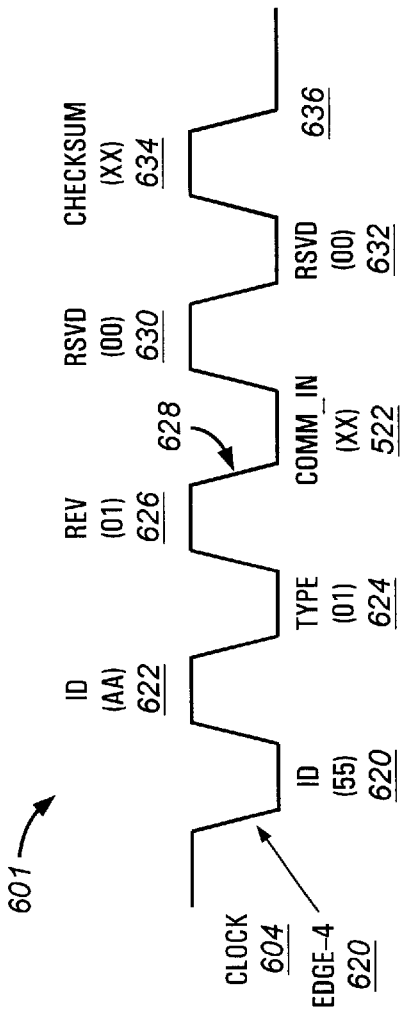

Turning now to FIG. 6B, upon receipt of the falling clock edge-4 620, the SCSI repeater 40 enters an ACTIVE state 654. In the ACTIVE state 654, the SCSI repeater 40 negates the target side ATN output and, synchronous to the clock signal, on the falling clock edge-4 620, drives data onto a lower byte of SCSI_A 50 data lines by asserting a value representing an ID, in this example the value "0x55." An upper byte of the SCSI_A 50 is not driven. Upon receipt of a rising clock edge 622, the target 40 asserts additional ID data onto the lower byte of the SCSI_A 50 data lines, for example the value "0xAA." On a falling clock edge 624, the SCSI repeater 40 drives onto SCSI_A 50 a value that represents a device type for the SCSI repeater 40, for example the value "0x01". On rising clock edge 626, the SCSI repeater 40 drives onto SCSI_A 50 a value that represents a revision number of the software running on the SCSI repeater 40, for example the value "0x01." On a falling clock edge 628, the SCSI repeater 40 drives onto SCSI_A 50 data lines the COMM_IN<7..0> signal 522. A rising clock edge 630 and a falling clock edge 632 are reserved for future use and at this time values of zero are driven onto SCSI_A 50. On a rising clock edge 634, a checksum is driven onto SCSI_A 50 by the SCSI repeater 40. The checksum may be of any predefined parity or eliminated without detracting from the spirit of the invention.

Upon receipt of a twelfth clock edge, a falling edge 636, the SCSI repeater 40 resumes normal pass-through functions 656 thus enabling the SCSI device 38 to initiate the non-SCSI communication mode of the present invention with another repeater on the SCSI_B1<53..0> 352. In this manner, a chain of repeaters may be "daisy-chained" together and the SCSI device 38 can determine the number, location and status of each repeater in the chain. Once the final repeater in the chain has completed the non-SCSI communication mode of the present invention, the SCSI device 38 may reach a target SCSI device and initiate or resume with the target SCSI devices normal SCSI communications.

The FIGS. 6A and 6B and the examples of information communicated are exemplary. The signals and the number of clock edges utilized and the specific information communicated can be changed without detracting from the spirit of the invention.

The method of and apparatus of the present invention enables an initiator 38 to communicate with and receive information from the SCSI repeater 40 through the SCSI_A 50 by employing a method outside the standard SCSI protocol illustrated in FIG. 4. In another embodiment, the present invention may enable the initiator 38 to communicate with a number of SCSI repeaters daisy chained together.

The foregoing disclosure and description of the invention are illustrative and explanatory thereof, and various changes in the details of the illustrated apparatus and construction and method of operation may be made without departing from the spirit of the invention.

What is claimed is:

1. A method of communication between a plurality devices connected by a SCSI bus, the method comprising the steps of:
   sending a signal on the SCSI bus from a first device to a second device indicating a request to initiate in-band but out of SCSI protocol communication between the first device and the second device;
   receiving from the SCSI bus at the second device the signal and transitioning the second device into an idle state wherein the second device does not modify or relay any signal on the SCSI bus;
   sending on the SCSI bus a clock signal from the first device to the second device;
   receiving from the bus at the second device the clock signal and transitioning the second device into an active state upon receipt of a finite number of clock edges;
   sending data on the SCSI bus from the second device synchronously with the clock signal; and
   receiving the data from the SCSI bus at the first device.

2. The communication method of claim 1, wherein the clock signal is carried on an ATN signal on the SCSI bus.

3. The communication method of claim 1, wherein the first device is a SCSI bus controller and the second device is a bus repeater.

4. The communication method of claim 3, wherein, after completing sending data from the second device, the second device enters a pass-through mode so that the first device can communicate with a third device.

5. The communication method of claim 1, wherein the data is carried on data lines of the SCSI bus.

6. The communication method of claim 1, wherein the data is status information.

7. The communication method of claim 6, wherein the status information comprises:
   an ID of the second device;
   a type of the second device;
   a revision number of software operating on the second device; and
   data contained in a register or plurality of registers of the second device.

8. The communication method of claim 7, wherein the status information further comprises;
   a checksum calculated on the basis of the status information.

9. The communication method of claim 1, wherein the request to initiate the communication is comprised of the steps of:
   verifying that second device is connected to the SCSI bus;
   verifying that the SCSI bus is in a SCSI protocol MESSAGE_IN phase;
   de-asserting a REQ signal of the SCSI bus; and
   asserting a ACK signal of the SCSI bus.

10. A repeater circuit, the repeater circuit comprising:
    logic for detecting an in-band but out of SCSI protocol signal on a SCSI bus indicating a request from an initiator for data;
    logic for detecting, subsequent to the request signal, a clock signal on the SCSI bus from the initiator; and logic for the sending the data to the initiator synchronously with the clock signal.

11. The repeater circuit of claim 10, wherein the clock signal is received on an ATN signal on the SCSI bus.

12. The repeater circuit of claim 10, wherein the initiator is a SCSI bus controller.

13. The repeater circuit of claim 10, wherein the data is received on data lines of the SCSI bus.

14. The repeater circuit of claim 10, wherein the data is status information.

15. The repeater circuit of claim 14, wherein the status information comprises:
  an ID of the repeater circuit;
  a type of the repeater circuit;
  a revision number of software operating on the repeater circuit; and
  data contained in a register or plurality of registers of the repeater circuit.

16. The repeater circuit of claim 15, wherein the status information further comprises;
  a checksum calculated on the basis of the status information.

17. The repeater circuit of claim 10, wherein the request to initiate the communication is comprised of the steps of:
  verifying that repeater circuit is connected to the SCSI bus;
  verifying that the SCSI bus is in a SCSI protocol MESSAGE_IN phase;
  de-asserting a REQ signal of the SCSI bus; and
  asserting an ACK signal of the SCSI bus.

18. A storage system, the storage system comprising:
  a plurality of SCSI mass storage devices in an enclosure; and
  a repeater circuit coupled to the SCSI mass storage devices via a first SCSI bus, the repeater circuit comprising:
    logic for detecting an in-band but out of SCSI protocol signal on a second SCSI bus indicating a request from an initiator for data;
    logic for detecting, subsequent to the request signal, a clock signal on the second SCSI bus from the initiator; and
    logic for the sending the data to the initiator synchronously with the clock signal.

19. The storage system of claim 18, wherein the clock signal is received on an ATN signal on the second SCSI bus.

20. The storage system of claim 18, wherein the initiator is a SCSI bus controller.

21. The storage system of claim 18, wherein the data is received on data lines of the second SCSI bus.

22. The storage system of claim 18, wherein the data is status information.

23. The storage system of claim 22, wherein the status information comprises:
  an ID of the repeater circuit;
  a type of the repeater circuit;
  a revision number of software operating on the repeater circuit; and
  data contained in a register or plurality of registers of the repeater circuit.

24. The storage system of claim 23, wherein the status information further comprises;
  a checksum calculated on the basis of the status information.

25. The storage system of claim 18, wherein the request to initiate the communication is comprised of the steps of:
  verifying that the repeater circuit is connected to the second SCSI bus;
  verifying that the second SCSI bus is in a SCSI protocol MESSAGE_IN phase;
  de-asserting a REQ signal of the second SCSI bus; and
  asserting an ACK signal of the second SCSI bus.

26. A system, the system comprised of:
  a computer; and
  a storage system coupled to the computer, the storage system comprising;
    a plurality of SCSI mass storage devices in an enclosure; and
    a repeater circuit coupled to the SCSI mass storage devices via a first SCSI bus, the repeater circuit comprising:
      logic for detecting an in-band but out of SCSI protocol signal on a second SCSI bus indicating a request from an initiator for data;
      logic for detecting, subsequent to the request signal, a clock signal on the second SCSI bus from the initiator; and
      logic for the sending the data to the initiator synchronously with the clock signal.

27. The system of claim 26, wherein the clock signal is received on an ATN signal on the second SCSI bus.

28. The system of claim 26, wherein the initiator is a SCSI bus controller.

29. The system of claim 26, wherein the data is received on data lines of the second SCSI bus.

30. The system of claim 26, wherein the data is status information.

31. The system of claim 30, wherein the status information comprises:
  an ID of the repeater circuit;
  a type of the repeater circuit;
  a revision number of software operating on the repeater circuit; and
  data contained in a register or plurality of registers of the repeater circuit.

32. The system of claim 31, wherein the status information further comprises:
  a checksum calculated on the basis of the status information.

33. The system of claim 26, wherein the request to initiate the communication is comprised of the steps of:
  verifying that the repeater circuit is connected to the second SCSI bus;
  verifying that the second SCSI bus is in a SCSI protocol MESSAGE_IN phase;
  de-asserting a REQ signal of the second SCSI bus; and
  asserting an ACK signal of the second SCSI bus.

* * * * *